United States Patent [19]

Abe et al.

[11] Patent Number: 4,733,949
[45] Date of Patent: Mar. 29, 1988

[54] LIQUID CRYSTAL DISPLAY DEVICE

[75] Inventors: Hidetoshi Abe, Katsuta; Akio Mukoh, Mito; Teruo Kitamura, Katsuta; Norimasa Kamezawa, Mito; Yasuo Hanawa, Katsuta; Mikio Sato, Hitachi, all of Japan

[73] Assignee: Hitachi, Ltd., Tokyo, Japan

[21] Appl. No.: 808,255

[22] Filed: Dec. 12, 1985

Related U.S. Application Data

[63] Continuation of Ser. No. 396,032, Jul. 7, 1982, abandoned.

[30] Foreign Application Priority Data

Jul. 8, 1981 [JP] Japan .................. 56-105691

[51] Int. Cl.$^4$ .................. G02F 1/13; C09K 19/54; C09K 19/30; C09K 19/22
[52] U.S. Cl. .................. 350/350 R; 252/299.01; 252/299.1; 252/299.4; 252/299.5; 252/299.6; 252/299.61; 252/299.63; 252/299.64; 252/299.65; 252/299.66; 252/299.67; 252/299.68; 350/340; 350/341; 350/346; 350/349
[58] Field of Search ............ 252/299.5, 299.4, 299.63, 252/299.61, 299.64, 299.65, 299.66, 299.67, 299.68, 299.6, 299.01, 299.1; 350/350 R, 350 S, 346, 340, 349, 341

[56] References Cited

U.S. PATENT DOCUMENTS

| Re. 29,349 | 8/1977 | Strebel | 252/299.68 |
|---|---|---|---|
| 3,675,987 | 7/1972 | Rafuse | 252/299.5 |
| 3,910,682 | 10/1975 | Arai et al. | 252/299.4 |
| 3,951,845 | 4/1976 | Cole, Jr. | 252/299.5 |
| 4,000,084 | 12/1976 | Hsieh et al. | 252/299.68 |
| 4,011,173 | 3/1977 | Steinstrasser | 252/299.5 |
| 4,059,340 | 11/1977 | Kahn et al. | 252/299.4 |
| 4,068,923 | 1/1978 | Toida | 252/299.4 |
| 4,082,686 | 4/1978 | Tatsuta et al. | 252/299.5 |
| 4,090,975 | 5/1978 | Aldrich et al. | 252/299.5 |
| 4,147,656 | 4/1979 | Aldrich et al. | 252/299.64 |
| 4,173,544 | 11/1979 | Osman | 252/299.5 |
| 4,180,475 | 12/1979 | Schadt et al. | 252/299.5 |
| 4,198,130 | 4/1980 | Boller et al. | 252/299.5 |
| 4,227,778 | 10/1980 | Raynes | 252/299.63 |
| 4,328,116 | 5/1982 | Harrison | 252/299.63 |
| 4,410,445 | 10/1983 | Baur et al. | 252/299.5 |
| 4,464,283 | 8/1984 | Hasegawa et al. | 252/299.63 |
| 4,469,618 | 9/1984 | Hasegawa et al. | 252/299.63 |
| 4,564,694 | 1/1986 | Hirai et al. | 252/299.5 |

FOREIGN PATENT DOCUMENTS

| 58981 | 9/1982 | European Pat. Off. | 252/299.5 |
|---|---|---|---|
| 2636684 | 2/1978 | Fed. Rep. of Germany | 252/299.5 |
| 2418703 | 11/1984 | Fed. Rep. of Germany | 252/299.5 |
| 51-88485 | 8/1976 | Japan | 252/299.5 |
| 56-16582 | 2/1981 | Japan | 252/299.5 |
| 56-68636 | 6/1981 | Japan | 252/299.5 |
| 57-34176 | 2/1982 | Japan | 252/299.5 |

*Primary Examiner*—Teddy S. Gron
*Attorney, Agent, or Firm*—Antonelli, Terry & Wands

[57] ABSTRACT

In a liquid crystal display device produced by forming an orientation controlling film on each surface of upper and lower substrates having an electrode, placing a liquid crystal composition between said substrates, and then sealing the periphery of the substrate, the response times, particularly those at low temperatures can be reduced by using, as the aforesaid liquid crystal composition, a liquid crystal composition which is obtained by adding a material having a glass transition temperature ($T_g$) of $-90°$ C. or lower to a liquid crystal material base and has a $T_g$ of $-82°$ C. or lower.

25 Claims, 3 Drawing Figures

LIQUID CRYSTAL DISPLAY DEVICE

This is a continuation of application, Ser. No. 396,032, filed July 7, 1982, now abandoned.

DETAILED DESCRIPTION

This invention relates to a liquid crystal display device, more particularly a liquid crystal display device using a liquid crystal composition whose response times are short, in particular, at low temperatures.

The performances of twisted nematic (TN) type display, phase-change type display and guest-host type color display devices are important and concerned in constituting materials, display method and the like. Among the displaying performances, display response times (time $t_{on}$ from application of a voltage to appearance of display and time $t_{off}$ from taking-off of a voltage to disappearance of display) are important characteristics for all liquid crystal display devices. In particular, the improvement of response times on a low temperature side is important in all liquid crystal display devices. The response properties are desired to be improved.

When the response times of various liquid crystal materials are compared and evaluated, a temperature range in which each liquid crystal material shows a liquid crystal phase is an important factor. That is to say, when there are compared and evaluated the response times of two liquid crystal materials, one of which has a wide mesomorphic range (often abbreviated as "MR") on a low temperature side (e.g., $-15°$ C. to $+30°$ C.) and the other of which has a wide mesomorphic range on a high temperature side (e.g., $+15°$ C. to $+70°$ C.), the response times for the two liquid crystal materials cannot be said to be rightly evaluated even if the temperatures at observation for the response times are the same (e.g., 15° C.).

This is because the response time for the former liquid crystal material is measured in the vicinity of the upper limit temperature of its mesomorphic range (said upper limit temperature being a temperature at which a phase change from liquid crystal to isotropic liquid takes place), while the response time for the latter liquid crystal material is measured in the vicinity of the lower limit temperature of its mesomorphic range (said lower limit temperature being a temperature at which a phase change from crystal to liquid crystal takes place). Therefore, when the response times of a liquid crystal material are measured and evaluated, there has heretofore been used a method by which viscosity is employed as a parameter of the liquid crystal material and the evaluation is made with respect to the relationship between the response times and the viscosity.

In twisted nematic (TN) type liquid crystal display or other phase change type liquid crystal display, guest-host type liquid crystal display, and the like, the response times are determined from the thickness d of a liquid crystal layer, the voltage applied V, the viscosity $\eta$ of a liquid crystal material, and the like. However, decrease in the thickness of a liquid crystal layer d is limited, because when d is made extremely thin, there are problems in the contrast, which is one of the display qualities, and a technique for producing a cell. As to the voltage to be applied, driving conditions differ with liquid crystal display devices, and in consideration of a small consumption of electric power and the like, the devices tend to be driven at a low voltage. Therefore, the reduction of the response times of liquid crystal display devices is greatly dependent upon the liquid crystal material. According to the conventional way of thinking, in order to improve the responsiveness and particularly to reduce the response times in a low temperature range by liquid crystal material, the viscosity, which is one of the physical properties of liquid crystal materials themselves, is reduced. In order to reduce the response times, there have heretofore been developed and placed on the market, as liquid crystals having a low viscosity, liquid crystals having a molecular structure of biphenyl type or phenylcyclohexane type (in the formulas X is a side chain group).

Generally, the smaller the viscosity of the liquid crystal material or the higher the temperature at observation, the shorter the response time. However, minutely, the response times are not always determined even if the viscosity is determined, and the response times are sometimes constant even if the viscosity varies a little. In general, the viscosity of liquid crystal material is measured by means of a rotational viscometer as described above, and was obtained by formularizing Newton's law of viscosity. However, in a liquid crystal cell, liquid crystal molecules are aligned according to regularity, and hence the viscosity of a liquid crystal material used therein is not always in complete agreement with its viscosity obtained from the formula. That is to say, the viscosity of the liquid crystal material during the application of a voltage in the liquid crystal cell is thought to become a three-dimensional tensor according to non-Newtonian viscosity or alignment and participates in the response times. From this, it is considered that the viscosity of the liquid crystal material for the same response time varies to a certain extent. Physical properties of liquid crystal materials participating in the response time are thought to include their dielectric anisotropy, elastic constant and the like in addition to their viscosity.

When investigated in more detail, the viscosity, one of the physical properties of liquid crystal materials, is related to the mobility of liquid crystal molecules. The mobility of liquid crystal molecules is markedly dependent upon temperature: the molecules become less mobile as the liquid crystal materials are cooled to undergo transitions from isotropic liquid to liquid crystal and from liquid crystal to crystal, and with this, other physical properties will change. This temperature-dependent mobility of the molecules is thought to be based on a certain temperature value.

In general, in the case of polymer materials, their physical properties are often discussed by using their glass transition temperature. Thinking that the mobility of liquid crystal molecules is also based on the glass transition temperature of liquid crystal materials, the present inventors measured the glass transition temperatures of liquid crystal materials and investigated the relationship between each glass transition temperature and the response time. As a result, it was found that there was correlation between them.

An object of the present invention is to provide a liquid crystal display device having shorter response time at low temperature than those of conventional liquid crystal display devices.

The present invention relates to liquid crystal display devices comprising upper and lower substrates each having an electrode and an orientation controlling film formed on the surface of said substrates, a layer of a liquid crystal composition interposed between said substrates, and a sealing means disposed at the periphery of said substrates, the improvement wherein the aforesaid liquid crystal composition contains a liquid crystal material base and an additive of an organic compound having a glass transition temperature ($T_g$) of $-90°$ C. or lower the liquid crystal composition having a $T_g$ of $-82°$ C. or lower.

According to a preferable embodiment of this invention, the $T_g$ of the aforesaid liquid crystal composition is $-90°$ C. or lower. As the organic compound having a $T_g$ of $-90°$ C. or lower to be added to the aforesaid liquid crystal material base, there may be exemplified liquid crystalline substances and/or non-liquid crystalline substances. Preferable concrete examples of the aforesaid liquid crystal material base are listed in Table 1 given hereinafter, and preferable concrete examples of the liquid crystalline substances having a $T_g$ of $-90°$ C. or lower to be added thereto are listed in the No. 24 to No. 30 in Table 2 given hereinafter. Further, the non-liquid crystalline substances to be added to the aforesaid liquid crystal material base are defined, in general, as organic materials which per se have no liquid crystal phase even if heated or cooled and have solubility or miscibility with the liquid crystal. Said non-liquid crystalline substances are further desired not to deteriorate (dissolve) the orientation controlling films (controlling films for orienting liquid crystal molecules; as such films, there are commonly used those obtained by rubbing a thin film of an organic substance such as a polyimide or the like, or those obtained by obliquely vacuum-evaporating an inorganic substance such as $SiO_2$ or the like onto the aforesaid thin film) and the sealing means or sealant (a material for sealing the periphery of the upper and lower substrates of a liquid crystal display cell; as this material, additives comprising one or more organic substances or glass frit seal is commonly used). The influences of the non-liquid crystalline substances on the mesomorphic range (MR) vary depending on their added amount. Preferable concrete examples of the aforesaid non-liquid crystalline substances to be added to be liquid crystal material base are listed in the No. 11 to No. 23 in Table 2 given hereinafter. It is preferable that the additive of organic compound (liquid crystalline substance and/or non-liquid crystalline substance) to be added to the aforesaid liquid crystal material base has a $T_g$ of $-90°$ C. to 150° C.

The glass transition temperatures of polymer materials are often investigated and measured, however no case is known at all where the glass transition temperatures are measured for liquid crystal materials.

In the case of liquid crystal materials, the differential thermoanalytical method (DTA) and the differential scanning calorimetric measurement method (DSC) are generally utilized as methods for measuring the phase changing temperatures. According to these methods, the phase changing temperatures can exactly be measured by measuring heat absorption and evolution phenomena occurring at the phase changing temperatures. However, liquid crystal materials for practical use are mixed liquid crystal materials of 3 or 4 or more components in order to obtain a wide mesomorphic range from a low temperature side to a high temperature side, and hence the glass transition temperatures of the liquid crystal materials are also in a low temperature region. Therefore, in the case of conventional DTA and DSC apparatuses, adhesion of moisture in the air to a sample is caused, when measuring in the low temperature range, so that exact measurement is difficult. Accordingly, the present inventors measured the glass transition temperatures of liquid crystal materials by using a refrigerant such as liquid nitrogen or the like which could be cooled to a temperature in the low temperature region, and by producing an apparatus permitting heat measurement in a vacuum system. The measurement method is as follows. First, the temperature is raised to liquefy a liquid crystal material. Thereafter, the liquid crystal material is supercooled with liquid nitrogen so that its temperature reaches the temperature of the liquid nitrogen to make the liquid crystal material glassy. When the liquid crystal material is then heated at a rate of 1° K/min, the glass transition temperature of the liquid crystal material can be observed.

The classification of conventionally used nematic liquid crystal materials according to molecular structures is as shown in Table 1.

TABLE 1

| Nematic liquid crystal material | Example |
| --- | --- |
| Cyclohexylcyclohexane series | R—⟨H⟩—⟨H⟩—X |

TABLE 1-continued

| Nematic liquid crystal material | Example |
|---|---|
| Phenylcyclohexane series | R—[H]—[◯]—X |
| Biphenyl series | R—[◯]—[◯]—X |
| Terphenyl series | R—[◯]—[◯]—[◯]—X |
| Cyclohexylcyclohexanecarboxylate series | R—[H]—COO—[H]—X |
| Phenylcyclohexanecarboxylate series | R—[H]—COO—[◯]—X |
| Phenyl benzoate series | R—[◯]—COO—[◯]—X |
| | R—[◯]—COO—[◯]—COO—[◯]—X |
| Biphenylcyclohexanecarboxylate series | R—[H]—COO—[◯]—[◯]—X |
| Phenylbiphenylcarboxylate series | R—[◯]—[◯]—COO—[◯]—X |
| | X—[◯]—[◯]—COO—[◯]—R |
| Phenylbenzothioate series | R—[◯]—COO—[◯]—X |
| Benzylideneaniline series | R—[◯]—CH=N—[◯]—X |
| | X—[◯]—CH=N—[◯]—R |

TABLE 1-continued

| Nematic liquid crystal material | Example |
|---|---|
| Phenylpyrimidine series | R—⟨C⟩—⟨C(N,N)⟩—X |
| | R—⟨C(N,N)⟩—⟨C⟩—X |
| | R—⟨C⟩—⟨C(N,N)⟩—X (isomer) |
| | R—⟨C(N,N)⟩—⟨C⟩—X (isomer) |
| Phenyldioxane series | R—⟨O,O⟩—⟨C⟩—X |

In above Table 1, R is an alkyl group or an alkoxy group, and X is a nitro group, a cyano group or a halogen atom.

Liquid crystal materials used in practice in liquid crystal display devices are employed as mixed liquid crystal materials prepared by mixing 3 or 4 or more of the known liquid crystal materials shown in Table 1 in order to obtain a wide mesomorphic range (MR) and satisfactory practical characteristics.

The liquid crystal materials No. 1 to No. 5 shown in the comparative examples described hereinafter are known liquid crystal compositions prepared by mixing four to six of the liquid crystal materials shown in Table 1.

That is to say, the mixed liquid crystal material of No. 1 is a mixture of 20 parts by weight of trans-4-propyl(4'-ethoxyphenyl)cyclohexane, 20 parts by weight of trans-4-propyl(4'-cyanophenyl)cyclohexane, 10 parts by weight of trans-4-propyl(4'-butoxyphenyl)cyclohexane, 30 parts by weight of trans-4-pentyl(4'-cyanophenyl)cyclohexane, 15 parts by weight of trans-4-pentyl(4'-ethylbiphenyl)cyclohexane, and 5 parts by weight of 4-(trans-4-pentylcyclohexyl)4'-trans-4-propylcyclohexylbiphenyl. The mixed liquid crystal material of No. 2 is a mixture of 20 parts by weight of trans-4-propyl(4'-cyanophenyl)cyclohexane, 30 parts by weight of trans-4-pentyl(4'-cyanophenyl)cyclohexane, 15 parts by weight of trans-4-propyl(4'-pentoxy)cyclohexane, 15 parts by weight of trans-4-pentyl(4'-ethylbiphenyl)cyclohexane, 10 parts by weight of trans-4-pentyl(4'-cyanobiphenyl)cyclohexane, and 10 parts by weight of 4-pentyl-4'-cyanoterphenyl. The mixed liquid crystal material of No. 3 is a mixture of 30 parts of trans-4-propyl(4'-cyanophenyl)cyclohexane, 35 parts by weight of trans-4-pentyl(4'-cyanophenyl)cyclohexane, 25 parts by weight of trans-4-heptyl(4'-cyanophenyl)cyclohexane, and 10 parts by weight of trans-4-pentyl(4'-cyanobiphenyl)cyclohexane. The mixed liquid crystal material of No. 4 is a mixture of 50 parts by weight of 4-pentyl-4'-cyanobiphenyl, 30 parts by weight of 4-heptyl-4'-cyanobiphenyl, 15 parts by weight of 4-pentoxy-4'-cyanobiphenyl, and 5 parts by weight of 4-pentyl-4'-cyanoterphenyl. The mixed liquid crystal material of No. 5 is a mixture of 40 parts by weight of 4-pentyl-4'-cyanobiphenyl, 25 parts by weight of 4-pentoxy-4'-cyanobiphenyl, 5 parts by weight of 4-pentyl-(4'-cyanophenyl)pyrimidine, 10 parts by weight of 4-heptyl(4'-cyanophenyl)pyrimidine, 10 parts by weight of 4-butyl(4'-cyanobiphenyl)pyrimidine, and 10 parts by weight of 4-pentyl-4'-cyanoterphenyl.

The response time was measured for each of the above-mentioned mixed liquid crystal materials of No. 1 to No. 5 according to the following measurement method.

Measurement method

Between a pair of upper and lower substrates obtained by coating an organic polymer resin (polyimide isoindoloquinazoline dione) as an orientation controlling film onto a surface of each glass substrate of 3 mm×30 mm×40 mm having a transparent electrode of indium oxide and then rubbing the surface, there was placed glass fiber so that the gap between them may be 10 μm, after which the upper and lower substrates were attached to each other and subjected to curing with epoxy resin, whereby a cell was produced. Each of the mixed liquid crystal materials of No. 1 to No. 5 was sealed up in each of the thus obtained cells to obtain twisted nematic (TN) type liquid crystal display device. The response time at each temperature was measured. The voltage applied was twice as high as the threshold voltage. As to the material of No. 1, the threshold voltage is 2.15 V at 0° C., 1.95 V at 20° C. and 1.18 V at 30° C. The results are shown in FIG. 1, by No. 1 to No. 5.

Figure 1:
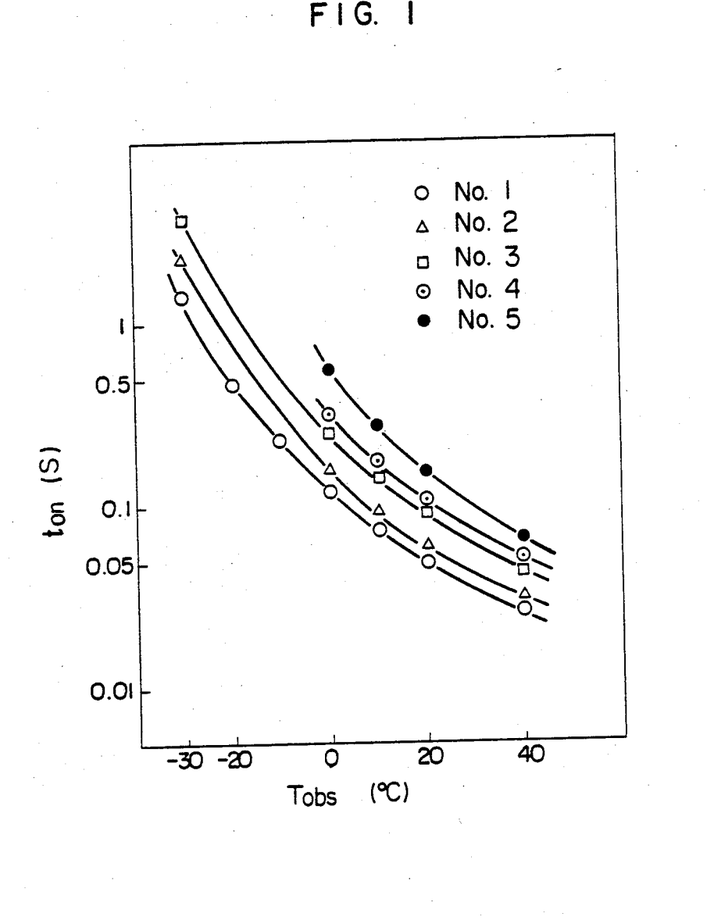
FIG. 1 is a graph showing the relationship between temperature at observation $T_{obs}$ (° C.) and response time $t_{on}$ (s) for known liquid crystal compositions No. 1 to No. 5.

That is to say, FIG. 1 is a graph showing the relationship between the temperature at observation $T_{obs}$ (° C.) (on the axis of abscissa) and the response time $t_{on}$ (s) (on the axis of ordinate) for each of the mixed liquid crystal materials of No. 1 to No. 5. In FIG. 1, the mark ○ shows the liquid crystal material No. 1, the mark △ that of No. 2, the mark □ that of No. 3, the mark ⊙ that of No. 4, and the mark ● that of No. 5.

As is obvious from FIG. 1, the relationship between the temperature at observation and the response time varies markedly depending on the liquid crystal compositions.

Accordingly, the glass transition temperature was measured for each of the mixed liquid crystal materials of No. 1 to No. 5 by using the apparatus and method already described. Next, the temperature difference between the glass transition temperature $T_g$ and a temperature $T_{obs}$ at which the aforesaid response time $t_{on}$ had been measured was taken as $\Delta T_g$ (i.e., $\Delta T_g = T_{obs} - T_g$), and the relationship between the $\Delta T_g$ and the response time $t_{on}$ was investigated.

The results are shown in the following Comparative Examples 1 to 5.

COMPARATIVE EXAMPLE 1

Figure 2:
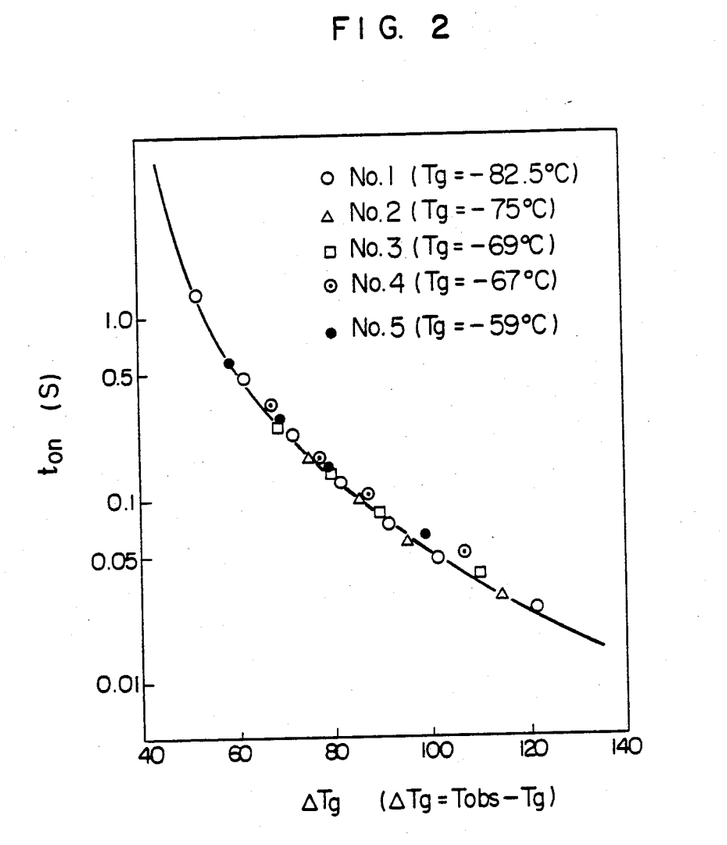
FIG. 2 is a graph showing the relationship of the response time $t_{on}$ (s) with $\Delta T_g$ which is a temperature difference between glass transition temperature $T_g$ of each of the known liquid crystal compositions No. 1 to No. 5 and the temperature at observation $T_{obs}$.

Measurements were made for the mixed liquid crystal material of No. 1 to find that $T_g$ was $-82.5°$ C. and that the relationships between $T_{obs}$ and $t_{on}$ and between $\Delta T_g$ and $t_{on}$ were as shown by the mark ○ in FIG. 1 and FIG. 2, respectively

COMPARATIVE EXAMPLE 2

Measurements were made for the mixed liquid crystal material of No. 2 to find that $T_g$ was $-75°$ C. and that the relationships between $T_{obs}$ and $t_{on}$ and between $\Delta T_g$ and $t_{on}$ were as shown by the mark △ in FIG. 1 and FIG. 2, respectively.

COMPARATIVE EXAMPLE 3

Measurements were made for the mixed liquid crystal material of No. 3 to find that $T_g$ was $-69°$ C. and that the relationships between $T_{obs}$ and $t_{on}$ and between $\Delta T_g$ and $t_{on}$ were as shown by the mark □ in FIG. 1 and FIG. 2, respectively.

COMPARATIVE EXAMPLE 4

Measurements were made for the mixed liquid crystal material of No. 4 to find that $T_g$ was $-67°$ C. and that the relationships between $T_{obs}$ and $t_{on}$ and between $\Delta T_g$ and $t_{on}$ were as shown by the mark ⊙ in FIG. 1 and FIG. 2, respectively.

COMPARATIVE EXAMPLE 5

Measurements were made for the mixed liquid crystal material of No. 5 to find that $T_g$ was $-59°$ C. and that the relationships between $T_{obs}$ and $t_{on}$ and between $\Delta T_g$ and $t_{on}$ were as shown by the mark ● in FIG. 1 and FIG. 2, respectively.

As is obvious from FIG. 2, the response time $t_{on}$ of each liquid crystal material is based on its glass transition temperature. That is to say, when the temperature difference $\Delta T_g$ between the glass transition temperature $T_g$ and the temperature at observation $T_{obs}$ for the response time is the same, the response time is the same whichever mixed liquid crystal material is used.

For this reason, for improving and reducing the response time of a liquid crystal display device, it is important to lower the glass transition temperature $T_g$ of a mixed liquid crystal material, to be used in the device, namely, to enlarge the temperature difference of $\Delta T_g$ in FIG. 2.

From investigations by the present inventors, it turned out that in order to lower the glass transition temperature $T_g$ of a liquid crystal composition, it is required to add an organic compound (liquid crystalline substance and/or a non-liquid crystalline substance) having a $T_g$ of $-90°$ C. or lower to a liquid crystal material base.

Examples of these liquid crystalline substance and non-liquid crystalline substance having a $T_g$ of $-90°$ C. or lower are listed in Table 2.

In No. 11 and No. 23 in Table 2 are shown known non-liquid crystalline substances suitable for use in this invention and their $T_g$'s. In No. 24 to No. 30 are shown liquid crystalline substances newly synthesized by the present inventors and their $T_g$'s.

In this invention, substances other than those listed in Table 2 may be used so long as they have a $T_g$ of $-90°$ C. or lower.

TABLE 2

| No. | Organic compound | Glass transition temperature (°C.) |
|---|---|---|
| 11 | Propene | −218 |
| 12 | Carbon tetrachloride | −213 |
| 13 | Isopentane | −208 |
| 14 | 2,3-Dimethylbutane | −197 |
| 15 | Chloroform | −194 |
| 16 | Ethyl alcohol | −183 |
| 17 | Cyclohexene | −181 |
| 18 | Dichloromethane | −180 |
| 19 | Methyl alcohol | −170 |
| 20 | Ethylbenzene | −162 |
| 21 | Vinyl alcohol | −150 |
| 22 | Isopropylbenzene | −147 |
| 23 | Cyclohexanol | −123 |
| 24 | 4-Butoxy-benzylidene-4'-butylaniline | −115 |

| 25 | 4-Hexyloxy-benzylidene-4'-butylaniline | −93 |

TABLE 2-continued

| No. | Organic compound | Glass transition temperature (°C.) |
|---|---|---|
| |  C$_6$H$_{13}$O—〈ring〉—CH=N—〈ring〉—C$_4$H$_9$ | |
| 26 | trans-4-Methyl-4'-(propoxymethylenephenyl)cyclohexane<br>CH$_3$—〈H〉—〈ring〉—CH$_2$OC$_3$H$_7$ | −102 |
| 27 | trans-4-Pentyl-4'-(butoxymethylenephenyl)cyclohexane<br>C$_5$H$_{11}$—〈H〉—〈ring〉—CH$_2$OC$_4$H$_9$ | −105 |
| 28 | trans-4-Pentyl-4'-(pentoxymethylenephenyl)cyclohexane<br>C$_5$H$_{11}$—〈H〉—〈ring〉—CH$_2$OC$_5$H$_{11}$ | −107 |
| 29 | 4-Pentyl-4'-(trans-propoxymethylenecyclohexane)benzene<br>C$_5$H$_{11}$—〈ring〉—〈H〉—CH$_2$OC$_3$H$_7$ | −107 |
| 30 | trans-4-Pentyl-4'-(methoxymethylenephenyl)cyclohexane<br>C$_5$H$_{11}$—〈H〉—〈ring〉—CH$_2$OCH$_3$ | −100 |

This invention is illustrated below referring to Example 1.

EXAMPLE 1

To 100 parts by weight of the above-mentioned mixed liquid crystal material of No. 1 was added 10 parts by weight of the substance of No. 21 in Table 2 in order that the resulting composition might have a lowered glass transition temperature. The glass transition temperature of the mixed liquid crystal composition newly prepared above was measured to find that T$_g$=−88° C., and its response time was 0.04 second as measured at 20° C. Therefore, as compared with the original liquid crystal material of No. 1, the newly prepared composition had a 5.5° C. lower glass transition temperature and a 0.01 second shorter response time at 20° C. The response time at −30° C. of said composition was 0.65 second, which was as much as 0.85 second shorter than 1.50 seconds, that of the original mixed liquid crystal material of No. 1.

The results obtained in above Example 1 and Comparative Example 1 to 5 are summarized in Table 3.

TABLE 3

| | | Glass transition temperature (T$_g$) | Response time (t$_{on}$) 20° C. | −30° C. |
|---|---|---|---|---|
| Example 1 | Mixed liquid crystal material of No. 1 + Non-liquid crystalline substance of No. 21 | −88° C. | 0.04 sec | 0.65 sec |
| Comparative Example 1 | Mixed liquid crystal material of No. 1 | −82.5 | 0.05 | 1.50 |
| Comparative Example 2 | Mixed liquid crystal material of No. 2 | −75 | 0.06 | 2.30 |
| Comparative Example 3 | Mixed liquid crystal material of No. 3 | −69 | 0.085 | 3.60 |
| Comparative Example 4 | Mixed liquid crystal material of No. 4 | −67 | 0.09 | — |
| Comparative Example 5 | Mixed liquid crystal material of No. 5 | −59 | 0.15 | — |

As shown in Table 3, when an additive having a T$_g$ of −90° C. or lower is added to a known mixed liquid crystal material, the resulting composition has an improved responsiveness. This effect of reducing the response time is the greater at the lower temperature.

The added amount of the non-liquid crystalline substance such as those listed in the No. 11 to No. 23 in Table 2 is determined depending on the miscibility after mixing and the mesomorphic range (MR) in which the resulting composition shows a liquid crystal phase. When the added amount is less than 5% by weight, there is brought about an insufficient effect of lowering the $T_g$ of a liquid crystal composition to be obtained. On the other hand, when it exceeds 20% by weight, the upper limit of the MR tends to be lowered. Therefore, the added amount ranges preferably from 5 to 20% by weight, but it may be outside the above-mentioned range depending upon use together with other additives, other conditions (environment for a liquid crystal display device) and the like.

The added amount of the liquid crystalline substance such as those listed in the No. 24 to 30 in Table 2 ranges preferably from 10 to 50% by weight.

Glass transition temperature is generally a physical property which is used in dealing with high molecular weight substances; however no case has been known yet where the glass transition temperature is measured for a liquid crystal. The present inventors measured $T_g$ for the above-mentioned mixed liquid crystal materials of No. 1 to No. 5 and other mixed liquid crystal materials obtained by mixing various liquid crystals produced and sold by liquid crystal makers to find that the mixed liquid crystal material of No. 1 had the lowest $T_g$ of $-82.5°$ C., and it was confirmed that the $T_g$ of this material is the lowest among those of liquid crystal compositions now put to practical use.

The response time of a liquid crystal display device is regarded as important most in a low temperature region, and a demanded guaranteed temperature in the low temperature region is thought to be $-30°$ C. That is to say, in order to make display in one second possible at $-30°$ C., it is necessary that going-on and -off should take place within a response time of 0.5 second. Judging from FIG. 2, it can be seen that in order to obtain a response time of 0.5 second or less, it is sufficient that $\Delta T_g$ is a temperature difference of 60° C. or more. When $T_{obs}$ is taken as $-30°$ C. because a temperature at observation at which the response time is the longest is $-30°$ C., $\Delta T(T_{obs}-T_g)$ is 60° C., so that $T_g$ becomes $-90°$ C. Accordingly, in order to enable the response time to be within 0.5 second on a low temperature side, particularly at $-30°$ C., in a liquid crystal display device, it is necessary to adjust the glass transition temperature $T_g$ of a liquid crystal composition to be used in the device to $-90°$ C. or lower. Therefore, in order to obtain a liquid crystal composition having a still shorter response time than that attained in the existing circumstances, it is preferable that a non-liquid crystalline substance and/or a liquid crystalline substance having a glass transition temperature $T_g$ of $-90°$ C. or lower is added so as to adjust the glass transition temperature $T_g$ of a liquid crystal composition to be obtained to $-90°$ C. or lower and further improve the responsiveness.

Figure 3:
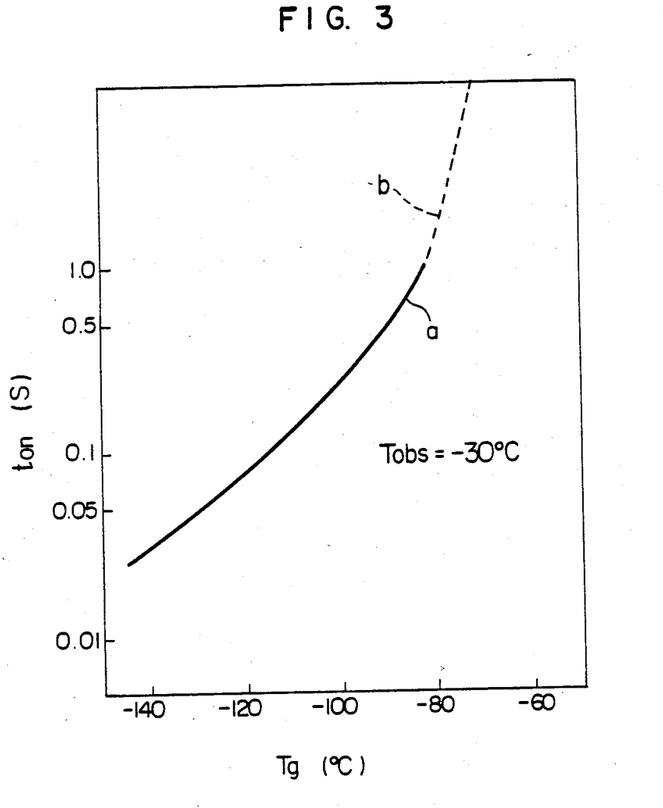
FIG. 3 is a graph showing the relationship between the glass transition temperature $T_g$ (° C.) of a liquid crystal composition and its response time $t_{on}$ (s) in the case where temperature at observation for the response time is adjusted to $-30°$ C..

The points described above are further explained by way of FIG. 3. The solid line a in FIG. 3 shows the relationship between the response time $t_{on}$ and the glass transition temperature $T_g$ in the case where the temperature at observation $T_{obs}$ for the response time is taken as $-30°$ C. from the results in FIG. 2 already described. In order to obtain a response time $t_{on}$ at $-30°$ C. of 0.5 second or less, the glass transition temperature $T_g$ of the liquid crystal composition is adjusted to $-90°$ C. or lower. The dotted line b shows the relationship between the $t_{on}$ and $T_g$ of a conventional liquid crystal composition.

This invention is further explained below referring to Examples 2 to 4.

EXAMPLE 2

To 100 parts by weight of the mixed liquid crystal material of No. 1 was added 40 parts by weight of a mixture of equimolar percentages of three kinds of the liquid crystals of Nos. 26, 27 and 28 in Table 2 in order that the resulting composition might have a lowered glass transition temperature $T_g$. The glass transition temperature $T_g$ of the liquid crystal composition newly prepared above was measured to be $-92°$ C., and its response time $t_{on}$ was 0.48 second at $-30°$ C.

EXAMPLE 3

To 100 parts by weight of the mixed liquid crystal material of No. 1 was added 40 parts by weight of the liquid crystal of No. 29 in Table 2 in order that the resulting mixture might have a lowered $T_g$. The $T_g$ of the mixed liquid crystal material newly prepared above was measured to be $-92°$ C., and its response time $t_{on}$ was 0.47 seconds as measured at $-30°$ C.

EXAMPLE 4

To 100 parts by weight of the liquid crystal material of No. 1 was added 40 parts by weight of the liquid crystal of No. 30 in Table 2 in order that the resulting mixture might have a lowered $T_g$. The $T_g$ of the thus obtained mixed liquid crystal material was measured to be $-91°$ C., and its response time $t_{on}$ was 0.49 second as measured at $-30°$ C.

In above Examples 2 to 4, when the added amount of each liquid crystalline substance as an additive for lowering the glass transition temperature $T_g$ was less than 10 parts by weight, there was brought about an insufficient effect of lowering $T_g$, and when it was more than 50 parts by weight, a temperature range in which the resulting composition has a liquid crystal phase became narrow. Accordingly, the added amount of the liquid crystal for lowering $T_g$ is suitably 10 to 50 parts by weight.

As explained above, the response time of a liquid crystal display cell can be reduced in a lower temperature range including room temperature, by adjusting the glass transition temperature $T_g$ of a liquid crystal composition to be used in said cell to $-90°$ C. or lower.

What is claimed is:

1. A liquid crystal display device comprising upper and lower substrates, each of said substrates having an electrode and an orientation controlling film formed on a surface thereof, a layer of liquid crystal composition interposed between said substrates, and a sealing means disposed at the periphery of said substrates, the improvement wherein the aforesaid liquid crystal composition is a liquid crystal composition having a $T_g$ of $-90°$ C. or lower, the liquid crystal composition including an organic compound having a $T_g$ of $-90°$ C. or lower, added to a liquid crystal material base, the organic compound having a $T_g$ of $-90°$ C. or lower being a liquid crystalline substance, said liquid crystalline substance acting to improve the response time of the liquid crystal composition, as compared to that of the liquid crystal material base, to thereby provide a response time of said liquid crystal display device that is 0.5 seconds or less at a temperatue as low as $-30°$ C.

2. A device according to claim 1, wherein the aforesaid liquid crystalline substance to be added to the liquid crystal material base is selected from the group consisting of 4-butoxy-benzylidene-4'-butylaniline, 4-hexyloxy-benzylidene-4'-butylaniline, trans-4-methyl-4'-(propoxymethylenepyhenyl)cyclohexane, trans-4-pentyl-4'-(butoxymethylenephenyl)cyclohexane, trans-4-pentyl-4'-(pentoxymethylenephenyl)cyclohexane, 4-pentyl-4'-(trans-propoxymethylenecyclohexane)benzene and trans-4-pentyl-4'-(methoxymethylenephenyl)-cyclohexane.

3. A device according to claim 2, wherein the amount of the aforesaid liquid crystalline substance to be added to the liquid crystal material base is 10 to 50% by weight.

4. A device according to claim 1, wherein the $T_g$ of the organic compound having a $T_g$ of $-90°$ C. or lower to be added to the liquid crystal material base is $-90°$ C. to $-150°$ C.

5. A liquid crystal display device comprising upper and lower substrates, each of said substrates having an electrode and an orientation controlling film formed on a surface thereof, a layer of liquid crystal composition interposed between said substrates, and a sealing means disposed at the periphery of said substrates, the improvement wherein the aforesaid liquid crystal composition is a liquid crystal composition having a $T_g$ of $-90°$ C. or lower, the aforesaid liquid crystal composition being prepared by adding an organic compound of a liquid crystalline substance having a $T_g$ of $-90°$ C. or lower, which acts to improve the response time of the liquid crystal composition, as compared to a liquid crystal material base, to the liquid crystal material base to thereby provide a response time of said liquid crystal display device that is 0.5 seconds or less at a temperature as low as $-30°$ C.

6. A device according to claim 5, wherein the liquid crystal material base comprises a mixture of liquid crystals to provide a wide mesomorphic range from a low temperature side to a high temperature side.

7. A device according to claim 6, wherein said mixture of liquid crystals comprises at least three liquid crystal components.

8. A device according to claim 7, wherein said at least three liquid crystal components are liquid crystal materials selected from the group consisting of cyclohexylcyclohexane series, phenylcyclohexane series, biphenyl series, terphenyl series, cyclohexylcyclohexane-carboxylate series, phenylcyclohexane-carboxylate series, phenyl benzoate series, biphenylcyclohexane-carboxylate series, phenylbiphenyl-carboxylate series, phenylbenzothioate series, benzylidene-aniline series phenylpyrimidine series and phenyldioxane series.

9. A device according to claim 5, wherein the liquid crystal material base comprises a mixture of at least three liquid crystal components.

10. A device according to claim 9, wherein said at least three liquid crystal components are liquid crystal materials selected from the group consisting of cyclohexylcyclohexane series, phenylcyclohexane series, biphenyl series, terphenyl series, cyclohexylcyclohexane-carboxylate series, phenylcyclohexane-carboxylate series, phenyl benzoate series, biphenylcyclohexane-carboxylate series, phenylbiphenyl-carboxylate series, phenylbenzothioate series, benzylidene-aniline series, phenylpyrimidine series and phenyldioxane series.

11. A device according to claim 1, wherein said liquid crystal composition has a wide mesomorphic range from a low temperature side to a high temperature side.

12. A device according to claim 1, wherein said liquid crystal composition has a wide mesomorphic range and includes a mixture of liquid crystals.

13. A device according to claim 1, wherein the aforesaid liquid crystalline substance to added to the liquid crystal material base is selected from the group consisting of trans-4-methyl-4'-(propoxymethylenephenyl)cyclohexane, trans-4-pentyl-4'-(butoxymethylenephenyl)cyclohexane, trans-4-pentyl-4'-(pentoxymethylenephenyl)cyclohexane, 4-pentyl-4'-(transpropoxymethylenecyclohexane benzene and trans-4-pentyl-4'-(methoxymethylenephenyl)cyclohexane.

14. A device according to claim 1, wherein the aforesaid liquid crystalline substance to be added to the liquid crystal material base is selected from the group consisting of trans-4-methyl-4'-(propoxymethylenephenyl)cyclohexane, trans-4-pentyl-4'-(butoxymethylenephenyl)cyclohexane, trans-4-pentyl-4'-(pentoxymethylenephenyl)cyclohexane, 4-pentyl-4'-(transpropoxymethylenecyclohexane)benzene and trans-4-pentyl-4'-(methoxymethylenephenyl)cyclohexane.

15. A device according to claim 5, wherein said liquid crystalline substance added to the liquid crystal material base is at least one substance selected from the group consisting of 4-butoxy-benzylidene-4'-butylaniline, 4-hexyloxy-benzylidene-4'-butylaniline, trans-4-methyl-4'-(propoxymethylenephenyl)cyclohexane, trans-4-pentyl-4'-(butoxymethylenephenyl)cyclohexane, trans-4-pentyl-4'-(pentoxymethylenephenyl)cyclohexane, 4-pentyl-4'-(trans-propoxymethylenecyclohexane)benzene, and trans-4-pentyl-4'-(methoxymethylenephenyl)-cyclohexane.

16. A liquid crystal display device comprising upper and lower substrates, each of said substances having an electrode and an orientation controlling film formed on a surface thereof, a layer of a liquid crystal composition interposed between said substrates, and a sealing means disposed at the periphery of said substrates, the improvement wherein the aforesaid liquid crystal composition contains a liquid crystal material base and an additive of an organic compound having a glass transition temperature ($T_g$) of $-90°$ C. or lower, said additive being a liquid crystalline substance, said liquid crystal composition having a $T_g$ of $-90°$ C. or lower, said additive acting to improve the response time of the liquid crystal composition, as compared to that of the liquid crystal material base, to provide a response time of the liquid crystal composition to be 0.5 seconds or less at temperatures as low as $-30°$ C.

17. A device according to claim 16, wherein the liquid crystal material base comprises a mixture of liquid crystals to provide a wide mesomorphic range from a low temperature side to a high temperature side.

18. A device according to claim 16, wherein the $T_g$ of the organic compound having a $T_g$ of $-90°$ C. or lower to be added to the liquid crystal material base is $-90°$ C. to $-150°$ C.

19. A device according to claim 1, the device being selected from the group consisting of twisted nematic display device, phase-change display device and guest-host color display device.

20. A device according to claim 16, the device being selected from the group consisting of twisted nematic display device, phase-change display device and guest-host color display device.

21. A device according to claim 5, the device being selected from the group consisting of twisted nematic display device, phase-change display device and guest-host color display device.

22. A device according to claim 1, wherein said liquid crystal material base is at least one liquid crystal material selected from the group consisting of cyclohexylcylohexane series, phenylcyclohexane series, biphenyl series, terphenyl series, cyclohexylcyclohexane-carboxylate series, phenylcyclohexane-carboxylate series, phenyl benzoate series, biphenylcyclohexane-carboxylate series, phenylbiphenyl-carboxylate series, phenylbenzothioate series, benzylidene-aniline series, phenylpyrimidine series and phenyl-dioxane series.

23. A device according to claim 19, wherein the aforesaid liquid crystalline substance to be added to the liquid crystal material base is selected from the group consisting of 4-butoxy-benzylidene-4'-butylaniline, 4-hexyloxy-benzylidene-4'-butylaniline, trans-4-methyl-4'-(propoxymethylenephenyl)cyclohexane, trans-4-pentyl-4'-(butoxymethylenephenyl)cyclohexane, trans-4-pentyl-4'-(pentoxymethylenephenyl)cyclohexane, 4-pentyl-4'-(trans-propoxymethyelencyclohexane)benzene and trans-4-pentyl-4'-(methoxymethylenephenyl)-cyclohexane.

24. A device according to claim 23, wherein the liquid crystal material base is a mixture of liquid crystals selected from the group consisting of (1) trans-4-propyl(4'-ethoxyphenyl)cyclohexane, trans-4-propyl(4'-cyanophenyl)cyclohexane, trans-4-propyl(4'-butoxyphenyl)-cyclohexane, trans-4-pentyl(4'-cyanophenyl)cyclohexane, trans-4-pentyl(4'-ethylbiphenyl)-cyclohexane and 4-(trans-4-pentylcyclohexyl)4'-trans-4-propylcyclohexylbiphenyl; (2) trans-4-propyl(4'-cyanophenyl)cyclohexane, trans-4-pentyl(4'-cyanophenyl)cyclohexane, trans-4-propyl(4'-pentoxy)-cyclohexane, trans-4-pentyl(4-ethylbiphenyl)cyclohexane, trans-4-pentyl(4'-cyanobiphenyl)cyclohexane and 4-pentyl-4'-cyanoterphenyl; (3) trans-4-propyl(4'-cyanophenyl)cyclohexane, trans-4-pentyl(4'-cyanophenyl)cyclohexane, trans-4-heptyl(4''-cyanophenyl)-cyclohexane and trans-4-pentyl-(4'-cyanobipyhenyl)cyclohexane; (4) 4-pentyl-4'-cyanobiphenyl, 4-heptyl-4'-cyanobiphenyl, 4-pentoxy-4'-cyanobiphenyl and 4-pentyl-4'-cyanoterphenyl; and (5) 4-pentyl-4'-cyanobiphenyl, 4-pentoxy-4'-cyanobiphenyl, 4-pentyl-(4'-cyanophenyl)pyrimidine, 4-heptyl(4'-cyanophenyl)pyrimidine, 4-butyl)4'-cyanobiphenyl)pyrimidine and 4-pentyl-4'-cyanoterphenyl.

25. A device according to claim 24, wherein the aforesaid liquid crystalline substance to be added to the liquid crystal material base is selected from a group consisting of trans-4-methyl-4'-(propoxymethylenephenyl)cyclohexane, trans-4-pentyl-4'-(butoxymethlenephenyl)cyclohexane, trans-4-pentyl-4'-(pentoxymethylenephenyl)cyclohexane, 4-pentyl-4'-(trans-propoxymethylenecyclohexane) benzene and trans-4-pentyl-4'-(methoxymethylenephenyl)cyclohexane.

* * * * *